INVENTOR.
Hans Günter Nöller

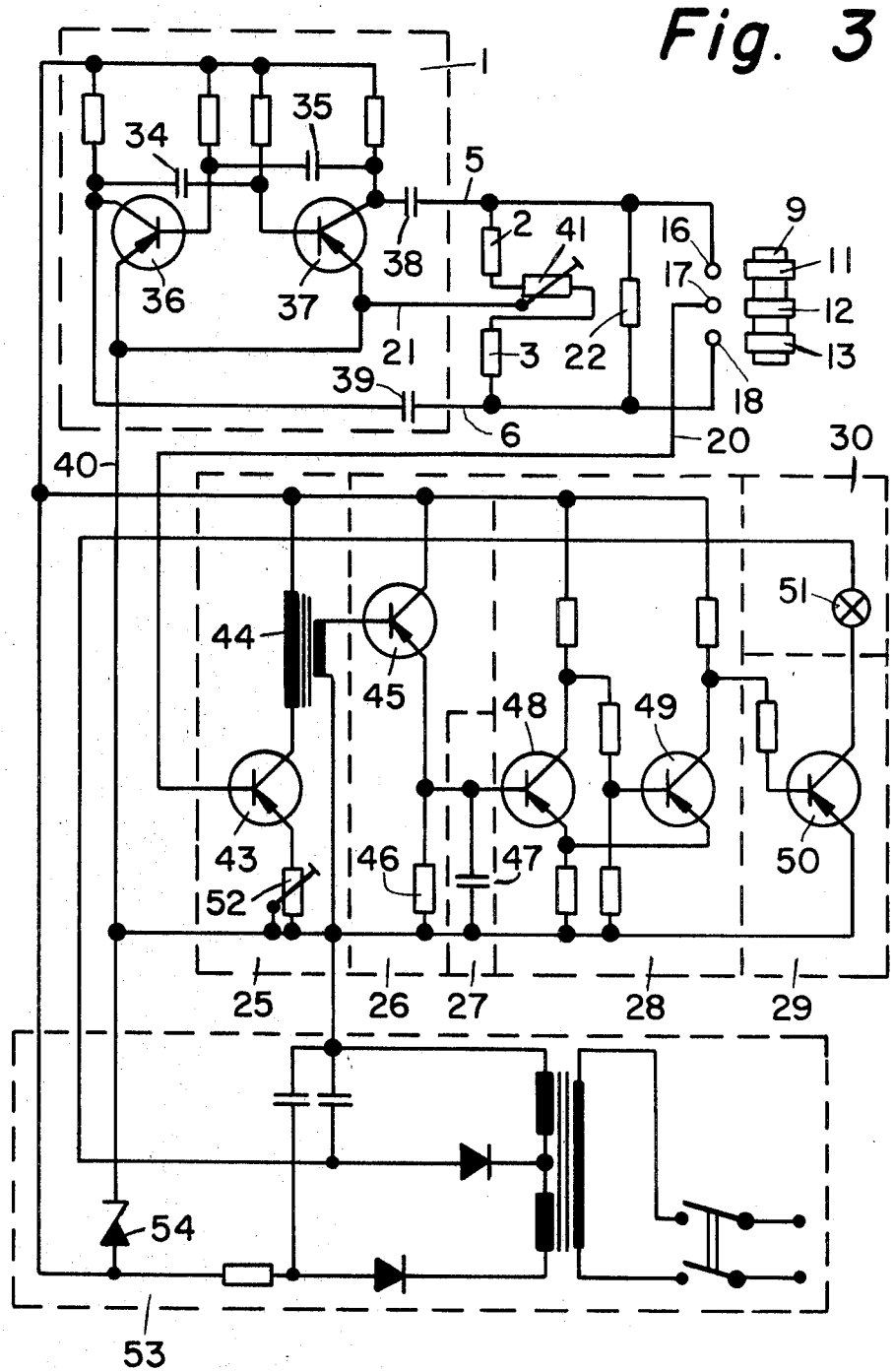

United States Patent Office 3,524,727
Patented Aug. 18, 1970

3,524,727
METHOD AND DEVICE FOR DETERMINING SEROLOGICAL DATA BY AN AGGLOMERATION TEST
Hans Günter Nöller, Heidelberg, Germany, assignor to Corning Glass Works, Corning, N.Y., a corporation of New York
Filed July 11, 1966, Ser. No. 564,094
Claims priority, application Germany, June 16, 1965, 1,598,846
Int. Cl. G01n 33/16; G01r 27/22
U.S. Cl. 23—230                          15 Claims

ABSTRACT OF THE DISCLOSURE

A method and device for determining serological data of a substrate by means of an agglomeration test wherein an agglutinin is added to the substrate to form a reaction mixture. The reaction mixture is disposed within an electrically non-conductive tubular vessel having a plurality of electrodes conductively connected with the interior thereof in a predetermined fixed relationship with one another for electrical contact with the reaction mixture. The separation of the substrate by agglutination is determined by measuring electrical resistance in the inhomogeneous components of the substrate of the reaction mixture. Means for indicating whether said separation has taken place is also provided.

---

Agglomeration tests are of great importance in modern serology. Such tests are utilized, inter alia, for blood type determinations, for the blood type crossing test, for proving the presence of RH-antibodies (Coombs test), and other antigen-antibody reactions, such as the Widal reaction, the Gruber-Widal reaction, or the Weil-Felix reaction. The tests are based on the fact that, when antigens and antibodies come together, there occurs an agglomeration of erythrocytes, cells, or bacteria and the like. Thus, for example, blood drawn directly from the ear or the finger for determining the blood type is transferred to two drops of A- and B-test serium on an object slide, and the occurrence of an agglutination is examined.

The evaluation of agglomeration tests of the above-described type has previously been exclusively optical. That is, a determination whether or not an agglomeration took place in the substrate-agglutinin mixture was made with the naked eye or a microscope. However, in many cases optical observation of the occurrence of agglomeration phenomena is very difficult, and only after an extended period of time, and/or with the aid of an incubator. Therefore, the optical evaluation of the test method is time-consuming, requires skilled personnel, and is prone to errors. This is particularly true when the test reactions must be conducted under emergency conditions, for example before blood transfusions can be given in case of accidents, where errors can lead to catastrophic mistakes.

The invention provides a method and device for rapidly and with certainty determining whether or not in reactions of the above-described type an agglomeration has taken place. The invention is based on the discovery that agglomerations or agglutinations which have their origin in antigen-antibody reactions lead to macroscopic inhomogeneities of electrical resistance within the substrate-agglutinin mixture. The method consists generally in determining and indicating the separation of the substrate occurring as a result of agglomeration automatically by measuring the electrical resistance of the inhomogeneous substrate components of the reaction mixture.

For example, in the case of blood the blood plasma is an electrically conductive electrolyte, while the erythrocytes suspended therein are electrically non-conductive. The erythrocytes normally are endowed with a substantial suspension power and thus are uniformly distributed in blood samples even after rather long periods of time have elapsed. Therefore, macroscopically, the blood samples represent a homogeneous electrical conductor. If a test serum is added to the blood sample which contains the specific antibodies, the blood sample agglutinates. The erythrocytes agglomerate. There is a local separation into electrically conductive and electrically non-conductive components. The reaction mixture loses its homogeneity. Local inhomogeneities of the electrical resistance become macroscopically detectable.

Comprehensive tests have shown that resistance inhomogeneities of the reaction mixture stemming from the agglomeration by antigen-antibody reactions can be detected very much earlier than optical proof of the agglomeration is available.

The resistance inhomogeneities can furthermore be accurately determined by measuring techniques. Consequently, the procedure becomes independent from the subjectively visual observation of the agglomeration by personnel conducting the tests. The possibility of making a mistake is practically eliminated.

In a further development of the invention, the reaction mixture is preferably introduced into a vertically positioned tube, and the electrical resistance values of at least two sections of the column of reaction mixture are compared with each other. This procedure makes use of the phenomenon that erythrocytes, cells, bacteria, and the like lose their suspension power by agglomeration and form a sediment. The gravity thus enhances the separation of the reaction mixture into its individual components of different electrical conductivity.

In order to conduct an agglomeration determination in an accurate manner with old material which has been stored for a period of time, an agent hardening the membranes of the substrate particles is preferably added to the substrate immediately after it has been produced. This agent prevents the cellular membranes from becoming conductive, which occurs normally after a certain period of time, for example several days to several weeks. A suitable hardening agent is, inter alia, a sublimate of appropriate concentration such as, for example, mixtures including $HgCl_2$, as is well known to those familiar with the art. Other suitable hardening agents well known to those familiar with the art are mixtures of chromic acid, picric acid, Formalin, a solution of gaseous formaldehyde, or the like. For an understanding of hardening agents and examples thereof, reference is made to Microtechnique—Text and Laboratory Exercises, by William H. Emig (1959), Library of Congress card No. 59-14842, pages 9–20.

In order to correctly distinguish between a pseudo-agglutination, known as "nummular formation," and a genuine agglutination, the reaction mixture can be subjected to a slightly vibrating motion, while measuring the resistance. Thereby, the nummular shapes are broken up, but the agglutinates are not influenced.

For conducting the process according to the invention, there is provided an electrically non-conductive support for the reaction mixture with several electrodes which are in electrically conductive connection with the reaction mixture and are connectable to a resistance measuring device. Preferably, a capillary tube having two resistance measuring paths insertable in two branches of a resistance measuring bridge is employed as the vessel for the reaction mixture.

The measuring paths can be limited by annular electrodes sealed into the capillary tube, which electrodes are capable of providing a relatively large-area contact with the reaction mixture, as well as with corresponding contact terminals of the measuring device. The annular electrodes can be made of a noble metal, particularly of gold, or they can be provided with a noble metal coating at least on the surfaces coming into contact with the reaction mixture. However, it has been discovered that even on the contact surface between electrodes and reaction mixture, noble metals are not necessarily required, and that in many cases cheaper electrodes of high-quality stainless steel are completely satisfactory. Thus, for example, in a device for blood type determinations constructed in accordance with this invention, the same satisfactory results were obtained when using annular electrodes of V2A steel as when using gold electrodes.

In order to prevent undesired adherence of reaction mixture components at the walls of the vessel for the reaction mixture, for example the capillary tube, such vessel is preferably provided with a suitable coating. A coating of silicone on the reaction mixture vessel was found to be particularly suitable.

In order to avoid difficulties caused by polarization phenomena at the electrode surfaces contacting the electrolytic reaction mixture, the resistance measuring bridge is preferably supplied with alternating voltage; this has the additional advantage that the bridge output signal can be amplified in a simpler manner than in the case wherein the bridge is supplied with direct current voltage.

Particularly suitable proved to be the application of a square wave or rectangular voltage of about 10 kc. to the resistance measuring bridge. Square wave voltage can be easily produced with the aid of flip-flop circuits. With a frequency in the range of 10 kc., the polarization resistance is already negligibly small. On the other hand, this frequency is still sufficiently low to ensure a sufficiently high resistance of, for example, the erythrocytes which become conductive at higher frequencies.

Basically, it is of course possible to translate the resistance inhomogeneities effected by an antigen-antibody reaction into figures. Since agglomeration tests are, however, by their nature yes-no tests—agglutination either does or does not occur—the evaluation is preferably conducted on a yes-no basis. For this purpose, an indicating device is connected behind the resistance measuring bridge, which indicating device responds upon a predetermined imbalance of the bridge and delivers a yes-no indication. The yes-no indication makes it possible for even unskilled personnel to read the results in a foolproof manner. By designing the indicating device to be actuated only when a predetermined minimum imbalance or detuning of the bridge has been exceeded, a minor sedimentation which might occur under certain circumstances without an antigen-antibody reaction is prevented from triggering the indicating device.

Particularly suited for the purposes of the present invention is a Schmitt trigger assuming, when the bridge is balanced, one of its equilibrium conditions and being switchable into the other equilibrium condition at a predetermined bridge output voltage. An A.C. voltage amplifier stage, an impedance transducer, and a median value generator are preferably connected between the bridge output and the Schmitt trigger. The A.C. voltage amplifier permits indication of minor imbalances of the bridge. The impedance transducer connected thereafter adjusts the high-ohmic amplifier output to the low-ohmic input of the Schmitt trigger. The median value generator derives, from the amplified rectangular signal of the bridge output, a D.C. signal proportionate to the rectangular signal amplitude for controlling the Schmitt trigger.

A final amplifier stage and an optical indicator are preferably connected after the Schmitt trigger.

Since oftentimes several tests must be conducted simultaneously, the measuring bridge is preferably provided with two or more parallel measuring channels; a vessel for the reaction mixture is connectable to each measuring channel.

The measuring channels can be connectable, for example via a mechanical or electronic switch, successively to an indicating device common to all measuring channels. In order to eliminate from the start any erroneous correlations between the value indicated and the individual vessels with reaction mixtures, there is, however, preferably provided an individual indicating device for each measuring channel.

By providing a preliminary load resistor in parallel with the input of the measuring bridge, the load upon the generator supplying the bridge can be advantageously made practically independent of the number of measuring channels utilized in each particular test series.

The invention is explained in greater detail in the following description of several embodiments in conjunction with the appended drawings.

FIG. 3 is a detailed circuit diagram of the arrangement of FIG. 1 for one of the measuring channels and the indicating device connected behind this measuring channel.

Figures 1, 2:
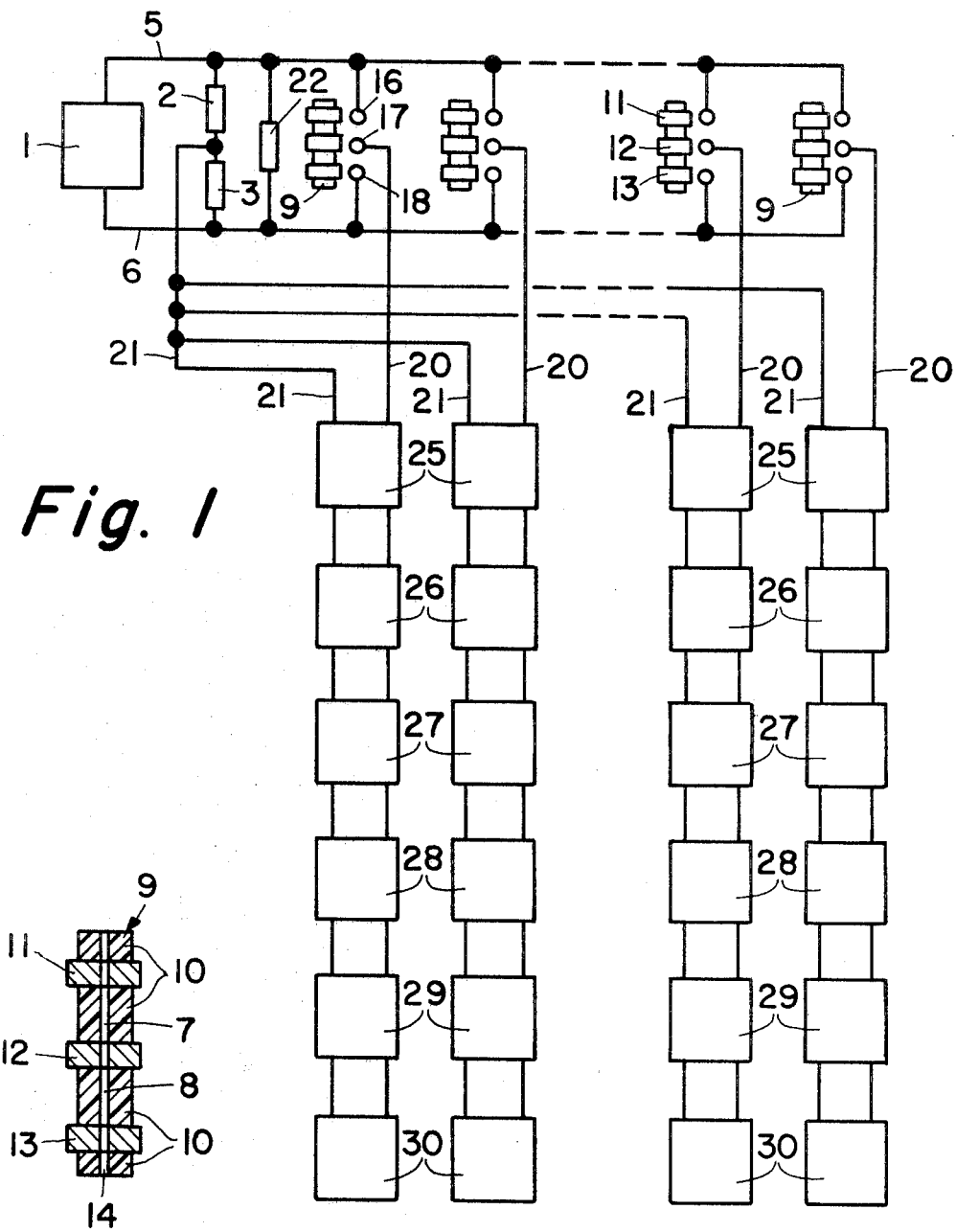
FIG. 1 shows a block circuit diagram of a device constructed according to the invention.
FIG. 2 shows a section through a vessel for the reaction mixture usable in conjunction with the device of FIG. 1.

The device according to FIG. 1 is provided with a rectangular voltage generator 1 producing a rectangular voltage having a frequency in the range of 10 kc. A Wheatstone measuring bridge is connected with the output of the rectangular voltage generator 1. Two of the bridge branches are formed by two bridge resistors 2 and 3 having an identical resistance value and being connected in series between the two output lines 5 and 6 of the rectangular voltage generator 1. The two other bridge branches are provided in multiple pairs and are formed by the resistance measuring paths 7 and 8 of reaction mixture vessels 9, which paths are electrically connected in series with each other as shown in FIG. 2.

As can be seen in detail from FIG. 2, each of the reaction mixture vessels 9 consists of an alternating sequence of electrically insulating annular segments 10 and electrically conductive annular electrodes 11, 12 and 13. The annular segments 10 and the annular electrodes 11, 12 and 13 are firmly connected with one another mechanically and have aligned central bores of identical diameters, together resulting in a capillary 14 extending all the way therethrough. The portion of the capillary located between the annular electrodes 11 and 12 forms the resistance measuring path 7, and the portion of the capillary 14 located between the annular electrodes 12 and 13 forms the resistance measuring path 8. The resistance measuring paths 7 and 8 have the same length, amounting, at an inside diameter of the capillary opening of from 1 mm., for example to 10 mm.

The annular electrodes 11, 12 and 13 of the vessels 9 for the reaction mixture are connectable to contacts 16, 17 and 18 as shown in FIG. 1. The contacts 16 are connected to line 5, and the contacts 18 to line 6. The contacts 17 are connected to respectively one bridge output line 20. The other bridge output line 21 is connected to the junction point of the bridge resistors 2 and 3. A preliminary load resistor 22 is connected between the lines 5 and 6 in parallel to the series circuit of the bridge resistors 2 and 3.

As can be seen from the foregoing, the thus described arrangement represents a resistance measuring bridge with several measuring channels having in common the bridge resistors 2 and 3, and all being supplied by the rectangular voltage generator 1. In FIG. 1, four measuring channels are illustrated. In practice, any desired number of measuring channels, for example ten, can be connected in parallel.

The preliminary load resistor 22 ensures that the rectangular wave generator 1 is always under practically the same load, independently of the fact whether any, and if so, how many, reaction mixture vessels 9 are filled with reaction mixture and are connected to the measuring channel pertaining thereto. The resistance value of the resistor 22 is, for this purpose, relatively small as compared to the resistance value derived from the parallel connection of the resistance measuring paths 7 and 8 of all the measuring channels.

In the arrangement of FIG. 1, an individual indicating device is assigned to each measuring channel, which device responds at a predetermined detuning of the bridge. In the illustrated embodiment, each indicating device consists of an A.C. amplifier 25 connected to the bridge output line pair 20 and 21 pertaining thereto, an impedance transducer 26, a median value generator 27, a Schmitt trigger 28, a final amplifier stage 29, as well as an indicating device 30 actuated by the final amplifier stage and preferably being an optical indicator.

By means of the above-described arrangement, the process of the invention is conducted, for example, for determining a blood type as follows:

Samples of the blood to be determined are mixed, in the usual manner, with respectively a test serum A and a test serum B, and then introduced by injection or simply by capillary action into respectively one reaction mixture vessel 9. In order to prevent the reaction mixture from running out of the capillary 14 accidentally, the lower end of the reaction mixture vessel can be immersed in liquid wax or the like. The two reaction mixture vessels are then connected, in a vertical position, with respectively one set of contacts 16, 17 and 18. The contacts can be provided, for this purpose, with resilient tongues extending around the annular electrodes 11, 12 or 13 and detachably holding the vessels for the reaction mixture.

If, for example, blood of the A type is involved, there is no antigen-antibody reaction in the sample mixed with the test serum A. The suspension stability of the erythrocytes is preserved. The erythrocytes are uniformly distributed in the plasma. The reaction mixture has a uniform specific electrical resistance. Consequently, the electrical resistance of the resistance measuring path 7 of the capillary 14 between the annular electrodes 11 and 12 is identical to that of the resistance measuring path 8 between the annular electrodes 12 and 13. The resistance measuring bridge, formed from the resistors 2 and 3, as well as the resistance measuring paths 7, 8 is balanced. The bridge output voltage present at the bridge output lines 20, 21 has the value zero. Consequently, the Schmitt trigger 28 does not receive an input signal and remains in its rest position. The indicator 30 remains in the starting position.

In contradistinction thereto, in the reaction mixture consisting of the blood sample and the test serum B there occurs an antigen-antibody reaction. The blood sample is agglutinized, i.e., erythrocytes agglomerate and thus there are produced, because of the differing conductivity of the erythrocytes and the plasma, macroscopic inhomogeneities of the inherent electrical resistance of the reaction mixture. The suspension power of the erythrocytes is lost. The electrically non-conductive erythrocyte agglomerations descend in the capillary 14 under the influence of gravity. Therefore, the resistance measuring path 8 is enriched with electrically non-conductive components of the reaction mixture, while in the measuring path 7, the electrically conductive blood plasma is depleted of non-conductive components. The electrical resistance of the measuring path 7 decreases, and the resistance of the measuring path 8 increases. The measuring bridge becomes unbalanced. At the bridge output lines 20, 21, there occurs an output signal in the form of a 10 kc. rectangular voltage. This output signal is amplified in the A.C. voltage amplifier 25, and is fed in low-ohmic form via the impedance transducer 26, as well as the median value generator 27, in the form of a D.C. signal, to the Schmitt trigger 28. As soon as the D.C. voltage signal exceeds a predetermined threshold value corresponding to a predetermined bridge detuning magnitude, the Schmitt trigger 28 is flipped and actuates the indicator 30 via the final amplifier stage 29.

The threshold value of the Schmitt trigger is selected such that the bridge imbalance, which occurs to a certain extent even when an antigen-antibody reaction does not take place, cannot lead to an actuation of the indicator 30 because of the slow sedimentation of the erythrocytes in the vertical capillary 14.

As illustrated in FIG. 3, the rectangular generator 1 consists of an astable multivibrator having two transistors 36 and 37 mutually in feedback with each other via negative feedback condensers 34 and 35. The rectangular output signal of the generator 1 is symmetrically applied to a neutral conductor 40 via coupling condensers 38 and 39 in the output lines 5 and 6, and is then applied to the bridge input. The neutral conductor 40 is connected to the bridge output line 21; the latter, in turn, is connected to the wiper of a centering potentiometer 41 inserted between the bridge resistors 2 and 3.

The bridge output is connected, via the lines 20 or 21 and 40, with the emitter-base circuit of the transistor 43 of the A.C. voltage amplifier 25. Its output is coupled, via a transformer 44, with the input of the impedance transducer 26 provided with a transistor 45. A condenser 47 is connected in parallel with the emitter resistor 46 of the transistor 45. The values of the resistor 46 and the condenser 47 are adjusted to each other in such a manner that the condenser 47 is charged to the sum voltage derived from the bias present at the resistor 46 and the median value of the rectangular output signals of the impedance transducer 26, converted into the corresponding voltage value. In this manner, the rectangular signal is converted into a D.C. voltage signal controlling the Schmitt trigger 28 connected thereafter.

The Schmitt trigger 28 provided with the transistors 48 and 49 has the ability to emit an output signal which can assume only two different values, depending upon whether the input voltage is below or above a certain voltage value. If the measuring bridge is balanced, or if the detuning of the bridge is below a predetermined magnitude, the Schmitt trigger 28 assumes the switching position wherein the transistor 50 of the final amplifier stage 29 connected thereafter is blocked. Once the bridge imbalance, and thus the D.C. signal present at the condenser 47, exceeds the predetermined (set) threshold value, the Schmitt trigger 28 is flipped into the other switching condition. The transistor 50 is unblocked. An indicator lamp 51 inserted in the collector circuit of the transistor 50 lights up. The degree of bridge detuning to be present so that the indicator lamp 51 lights up can be set by the potentiometer 52 in the emitter circuit of the transistor 43.

The main 53 serves as the current supply for the rectangular or square wave generator 1 and the stages 25–30. The supply voltage of the rectangular generator 1 and the stages 25–28 is stabilized by means of a Zener diode 54.

The process and the device according to the invention can be advantageously used likewise for determining the coagulation time of blood or the like. For example, in an extravasal blood coagulation, the blood changes from the liquid sol condition into the semiliquid gel condition. From the liquid serum, the red coagulated blood separates in the form of a blood clot and contracts. Thus, a variation in the distribution of the mixture takes place (serum, on the one hand, and coagulum, on the other hand) in front of the electrodes remaining at a constant distance, and thus a change occurs in the resistance which can be determined and evaluated in the above-described manner. Suitably, for evaluating purposes, a time member of conventional construction is provided which can be connected via a plug as an attachment. In this connection, the capillary is preferably coated with silicone and closed off, at the lower end, by a plug having no silicone thereon.

Obviously, many modifications and variations of the invention as hereinabove set forth can be made without departing from the essence and scope thereof, and only such limitations should be applied as are indicated in the claims.

I claim:

1. A process for determining serological data of a substrate by means of an agglomeration test comprising the steps of
    providing a substrate,
    adding an agglutinin to said substrate to obtain a reaction mixture, and
    measuring the electrical resistance of the inhomogeneous components of the substrate of said reaction mixture, whereby the electrical resistance indicates whether separation of the substrate by agglutination has taken place.

2. The process of claim 1 wherein the reaction mixture is introduced into a vertically positioned tube having at least two sections, measuring the electrical resistances of said reaction mixture within at least two of said sections, and thereafter comparing the measured electrical resistances to determine whether the separation of the substrate by agglutination has taken place.

3. The process for determining serological data of a substrate by means of an agglomeration test comprising the steps of
    providing a substrate,
    adding an agglutinin to said substrate to obtain a reaction mixture, and
    measuring the electrical resistivities of two distinct portions of said mixture, whereby a difference in the resistivities of said two portions indicates whether separation of the substrate by agglutination has taken place.

4. A process for determining serological data of a substrate by means of an agglomeration test comprising the steps of
    providing a substrate the particles of which have membranes,
    treating said substrate with an agent for hardening said membranes immediately after the substrate was produced, thereby preventing said membranes from becoming conductive,
    adding an agglutinin to said substrate to obtain a reaction mixture, and
    measuring the electrical resistance of the inhomogeneous components of the substrate of said reaction mixture, and whereby the electrical resistance indicates whether separation of the substrate by agglutination has taken place.

5. A device for determining serological data comprising
    a resistance bridge having first and second input terminals,
    means connected to said first and second input terminals for feeding an A.C. voltage to said resistance bridge,
    an electrically non-conductive tubular vessel suitable for disposing therewithin a reaction mixture,
    first, second and third electrodes conductively connected with the interior of said vessel for electrical contact with said reaction mixture, first and second distinct electrical paths being defined in said reaction mixture between said first and second electrodes and said second and third electrodes, respectively, said first and third electrodes being respectively connected to said first and second bridge input terminals, and
    means connected to said second electrode for indicating an inequality in the resistivities of those portions of said reaction mixture which form said first and second electrical paths.

6. A device for determining serological data comprising
    a plurality of electrically non-conductive tubular vessels suitable for disposing therewithin a reaction mixture,
    each of said vessels having at least three electrodes conductively connected with the interior thereof for electrical contact with said reaction mixture,
    a resistance bridge having two input terminals,
    means connected to said two bridge input terminals for feeding an A.C. voltage thereto,
    means connecting two of the plurality of electrodes from each of said plurality of tubular vessels to said two bridge input terminals, and
    a plurality of indicating means respectively connected to the remaining of said plurality of electrodes of each of said tubular vessels for indicating an inequality in the resistivities of those portions of said reaction mixture which form said at least two electrical paths.

7. The device of claim 6 wherein a preliminary load resistor is connected between said two bridge input terminals.

8. A device for determining serological data comprising
    an electrically non-conductive tubular vessel suitable for disposing therewithin a reaction mixture,
    at least three electrodes conductively connected with the interior of said vessel in a non-movable predetermined fixed relationship with one another for electrical contact with said reaction mixture at least two distinct electrical paths being defined in said reaction mixture between said at least three electrodes, and
    indicating means connected to said electrodes for indicating an inequality in the resistivities of those portions of said reaction mixture which form said at least two electrical paths.

9. The device of claim 8 wherein said tubular vessel comprises a capillary tube having first, second and third electrodes longitudinally spaced therein, a first electrical path being defined by that portion of said reaction mixture between said first and second electrodes and the second electrical path being defined by that portion of said reaction mixture between said second and third electrodes.

10. The device of claim 9 wherein the means for feeding the resistance measuring bridge with A.C. voltage comprises means for feeding it with a rectangular voltage of about 10 kc.

11. The device of claim 9 wherein said indicating means comprise a resistance bridge, said electrodes being connected to said bridge so that said first and second electrical paths constitute two branches of said bridge, and means connected to said bridge for feeding an A.C. voltage thereto.

12. The device of claim 11 wherein said indicating means include a Schmitt trigger which assumes, when the bridge is balanced, one of its equilibrium conditions at a predetermined resistance bridge output voltage, and means connected to said Schmitt trigger for indicating the condition thereof.

13. The device of claim 9 wherein said electrodes consist of stainless steel rings.

14. The device of claim 13 wherein a final amplifier stage, to which an optical indicator is connected, is connected to the output of the Schmitt trigger.

15. The device of claim 13 wherein the measuring bridge output is connected to an A.C. voltage amplifier stage which is connected to an impedance transducer which is connected to a median value generator to which the Schmitt trigger is connected.

References Cited

UNITED STATES PATENTS

| | | | |
|---|---|---|---|
| 3,267,363 | 8/1966 | Young | 23—230 XR |
| 3,267,364 | 8/1966 | Page et al. | 23—230 XR |
| 1,807,821 | 6/1931 | Behr. | |
| 2,215,213 | 9/1940 | Ellis. | |
| 2,616,950 | 11/1952 | Terpstra. | |
| 2,702,948 | 3/1955 | Seney. | |
| 2,901,740 | 8/1959 | Cutsogeorge | 340—233 |
| 3,193,762 | 7/1965 | Wu | 324—65 |
| 3,250,987 | 5/1966 | Okada et al. | 324—30 |
| 3,309,690 | 3/1967 | Moffitt | 340—258 |

OTHER REFERENCES

Henstell, H. H., Biol. Abstr. 24, 8850, 1950.

Trincher, K. S., Chem. Abstr. 50, 9548, 1956.

JOSEPH SCOVRONEK, Primary Examiner

R. M. REESE, Assistant Examiner

U.S. Cl. X.R.

23—253; 324—65

UNITED STATES PATENT OFFICE
CERTIFICATE OF CORRECTION

Patent No. 3,524,727          Dated August 18, 1970

Inventor(s) Hans G. Noller

It is certified that error appears in the above-identified patent and that said Letters Patent are hereby corrected as shown below:

In claim 10, line 1, the numeral "9" should be --11--.

In claim 14, line 1, the numeral "13" should be --12--.

In claim 15, line 1, the numeral "13" should be --12--.

Column 1, line 45 "serium" should be --serum--.

SIGNED AND SEALED
NOV 17 1970

(SEAL)
Attest:

Edward M. Fletcher, Jr.

Attesting Officer

WILLIAM E. SCHUYLER, JR.
Commissioner of Patents